United States Patent
Amthor et al.

(10) Patent No.: US 12,496,003 B2
(45) Date of Patent: Dec. 16, 2025

(54) APPARATUS FOR MONITORING OF A PATIENT UNDERGOING A MAGNETIC RESONANCE IMAGE SCAN

(71) Applicant: KONINKLIJKE PHILIPS N.V., Eindhoven (NL)

(72) Inventors: Thomas Erik Amthor, Hamburg (DE); Sanne Nauts, Eindhoven (NL); Christopher Günther Leussler, Hamburg (DE); Joanne Henriette Desiree Monique Westerink, Eindhoven (NL); Peter Caesar Mazurkewitz, Hamburg (DE); Privender Kaur Saini, Veldhoven (NL); Raymond Van Ee, Geldrop (NL); Edwin Heijman, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 168 days.

(21) Appl. No.: 17/794,997

(22) PCT Filed: Jan. 29, 2021

(86) PCT No.: PCT/EP2021/052046
§ 371 (c)(1),
(2) Date: Jul. 25, 2022

(87) PCT Pub. No.: WO2021/156142
PCT Pub. Date: Aug. 12, 2021

(65) Prior Publication Data
US 2023/0181074 A1   Jun. 15, 2023

(30) Foreign Application Priority Data
Feb. 4, 2020  (EP) .................................... 20155285

(51) Int. Cl.
*A61B 5/00* (2006.01)
*A61B 5/055* (2006.01)
*A61B 5/16* (2006.01)

(52) U.S. Cl.
CPC .............. *A61B 5/165* (2013.01); *A61B 5/055* (2013.01); *A61B 5/7275* (2013.01)

(58) Field of Classification Search
CPC ........ A61B 5/165; A61B 5/055; A61B 5/7275
See application file for complete search history.

(56) References Cited

U.S. PATENT DOCUMENTS

2013/0188830 A1   7/2013   Ernst et al.
2013/0211236 A1   8/2013   Beck
(Continued)

FOREIGN PATENT DOCUMENTS

EP   2921100 A1   9/2015
EP   3381353 A1   10/2018
EP   3546973 A1   2/2019

OTHER PUBLICATIONS

Melendez et al "Anxiety Related Reactions Associated with Magnetic Resonance Imaging Examinations" Jama 270(6) p. 745-747.
(Continued)

*Primary Examiner* — Amal Aly Farag

(57) ABSTRACT

An apparatus for monitoring patients undergoing a Magnetic Resonance Image (MRI) scan provides an input, a processor, and an output. The input provides the processor with at least one sensor data of a patient undergoing an MRI scan by an MRI scanner. The input provides the processor with at least one scan parameter of the MRI scanner for the MRI scan. The input also provides the processor with at least one characteristic of the patient. The processor predicts a stress level of the patient and/or a motion state of the patient, the prediction or predictions utilize at least one sensor data of the patient, the at least one scan parameter of the MRI
(Continued)

scanner, and the at least one characteristic of the patient. The output outputs information relating to the predicted stress level of the patient and/or the predicted motion state of the patient.

24 Claims, 2 Drawing Sheets

(56) References Cited

U.S. PATENT DOCUMENTS

| | | |
|---|---|---|
| 2013/0225950 A1 | 8/2013 | van Elswijk et al. |
| 2014/0088405 A1 | 3/2014 | Assmann et al. |
| 2015/0045654 A1 | 2/2015 | Lee et al. |
| 2016/0000383 A1 | 1/2016 | Lee |
| 2017/0027530 A1 | 2/2017 | Heismann |
| 2019/0130074 A1* | 5/2019 | Itu .......................... G06V 10/82 |
| 2020/0008703 A1 | 1/2020 | Zeller |

OTHER PUBLICATIONS

Andre et al "Toward Quantifying The Prevalence, Severity and Cost Associated with Patient Motion During Clinical MR Examinations" Journal of American College of Radiology 12(7) p. 689-695.
International Search Report and Written Opinion from PCT/EP2021/052046 mailed Apr. 21, 2021.

* cited by examiner ically visible or available to the technologist during an MRI examination or scan. However, if a patient becomes very anxious or feels pain, or moves unduly the scan should be stopped. In some cases, the patient may press the alarm button or make him/herself heard acoustically. But the decision to press the button can be very late. In the worst case, the button may not work due to a technical problem, the button could be lost or out of contact by the patient, or the patient may have lost consciousness without the technologist noticing.

APPARATUS FOR MONITORING OF A PATIENT UNDERGOING A MAGNETIC RESONANCE IMAGE SCAN

CROSS REFERENCE TO RELATED APPLICATIONS

This application is a U.S. national phase application of International Application No. PCT/EP2021/052046 filed Jan. 29, 2021, which claims the benefit of EP application Ser. No. 20155285.8 filed Feb. 4, 2020 and is incorporated herein by reference.

FIELD OF THE INVENTION

The present invention relates to an apparatus for monitoring of a patient undergoing a Magnetic Resonance Image (MRI) scan, an imaging system, a method for monitoring of a patient undergoing a Magnetic Resonance Image scan, as well as to a computer program element and a computer readable medium.

BACKGROUND OF THE INVENTION

Patient cooperation is an important determinant of the duration and diagnostic quality of an MRI-exam. To acquire an MR image, patients are required to enter a narrow bore in an unfamiliar loud machine and lie still for approximately 15 to 60 minutes. As such, many patients experience anxiety-related reactions to an MRI-exam (Meléndez, J. C., & McCrank, E. (1993). Anxiety-related reactions associated with magnetic resonance imaging examinations. Jama, 270 (6), 745-747), and patient movement is highly common in MRI-exams (occurring in 7% to 29% of MRI examinations; Andre, J. B., Bresnahan, B. W., Mossa-Basha, M., Hoff, M. N., Smith, C. P., Anzai, Y., & Cohen, W. A. (2015). Toward quantifying the prevalence, severity, and cost associated with patient motion during clinical MR examinations. Journal of the American College of Radiology, 12(7), 689-695). Patient movement may lead to the need to repeat parts of the MRI-exam (appr. 20% of MRI-scans is a repeat scan; Andre et al., 2015). Moreover, patients who are in severe discomfort sometimes leave the scanner before the exam is finished (these are called "incompleted exams").

Even though this anxiety can be detrimental for MRI success, currently hospital staff have very limited information about a participant's psychological state (e.g., level of anxiety or discomfort). They can only assess the mental state of the patient, their stress levels and therefore the likelihood of movement artefacts, by means of standard interpersonal contact. Moreover, they can only do so just before the actual scanning.

Thus the emotional and physiological state of the patient is not easily visible or available to the technologist during an MRI examination or scan. However, if a patient becomes very anxious or feels pain, or moves unduly the scan should be stopped. In some cases, the patient may press the alarm button or make him/herself heard acoustically. But the decision to press the button can be very late. In the worst case, the button may not work due to a technical problem, the button could be lost or out of contact by the patient, or the patient may have lost consciousness without the technologist noticing.

There is a need to address these issues.

SUMMARY OF THE INVENTION

It would be advantageous to have improved means of determining when to stop an MRI scan due to the patient becoming too anxious or moving body parts too much. The object of the present invention is solved with the subject matter disclosed herein, wherein further embodiments are described in detail. It should be noted that the following described aspects and examples of the invention apply also to the apparatus or monitoring of a patient undergoing a Magnetic Resonance Image scan, the imaging system, the method for monitoring of a patient undergoing a Magnetic Resonance Image scan, as well as to the computer program element and a computer readable medium.

In a first aspect, there is provided an apparatus for an apparatus for monitoring of a patient undergoing a Magnetic Resonance Image (MRI) scan, the apparatus comprising:
 an input unit;
 a processing unit; and
 an output unit.

The input unit is configured to provide the processing unit with at least one sensor data of a patient undergoing an MRI scan by an MRI scanner. The input unit is configured to provide the processing unit with at least one scan parameter of the MRI scanner for the MRI scan. The input unit is configured to provide the processing unit with at least one characteristic of the patient. The processing unit is configured to predict a stress level of the patient and/or predict motion state of the patient, the prediction or predictions comprising utilization of the at least one sensor data of the patient, the at least one scan parameter of the MRI scanner, and the at least one characteristic of the patient. The output unit is configured to output information relating to the predicted stress level of the patient and/or the predicted motion state of the patient.

In this manner, a patients' stress level and/or likelihood of movement is determined by analyzing the emotional and physiological state of the patient from sensor data, data about the scan being conducted, and from data about the patient and the development of these states is predicted into the future. Thus, real-time feedback can be provided to the technologist, who can then decides that a scan should be stopped and indeed the apparatus can automatically initiated such a stop if it is predicted that the patient is about to enter an anxiety state or movement state that is not consistent with the scan protocol.

Thus, the apparatus objectively measures and predicts a patient's level of anxiety/discomfort during scanning, as well as the predicted likelihood of movement artefacts. This information can be used to abort a scan automatically if required.

The issues addressed by the apparatus are that patient anxiety/discomfort is mitigated, which may otherwise negatively affect patients' experience. Scans can be stopped before patient motion, which is associated with reduced image quality, has compromised image quality.

Motion state of the patient can also be termed a movement state of the patient.

In an example, the processing unit is configured to implement at least one machine learning algorithm to predict the stress level of the patient and/or the motion state of the patient, wherein the at least one machine learning algorithm was trained on the basis of: at least one sensor data of one or more reference patients undergoing one or more reference MRI scans by one or more reference MRI scanners; at least one scan parameter of the reference MRI scanners used for the one or more reference MRI scans; at least one characteristic of each of the reference patients.

Thus, an AI-based algorithm is used to infer the emotional and physical state of a patient from sensor data, scan protocol data, and context information relating to the patient, enabling the development of the stress state and the movement state of the patient to be predicted.

In other words, a prediction algorithm takes data about a patient acquired before an exam that can be gathered at a hospital or at home and uses this with information gathered from sensors during a scan as well as details about the scan to predict the patient's anxiety level and movement level during the scan, where this determination can also make use of results of previous examinations.

In an example, the at least one sensor data of the patient was acquired by one or more of: camera, microphone, skin resistance sensor, skin temperature sensor, skin humidity sensor, skin accelerometer, pulse sensor, breathing sensor, radio frequency radar sensor, EEG sensor, processing unit, pressure sensor, weight sensor.

In an example, the at least one sensor data of the one or more reference patients was acquired by one or more of: camera, microphone, skin resistance sensor, skin temperature sensor, skin humidity sensor, skin accelerometer, pulse sensor, breathing sensor, radio frequency radar sensor, EEG sensor, processing unit, pressure sensor, weight sensor In an example, the at least one sensor data of the patient comprises one or more of: breathing rate data, heart rate data, voice data, skin resistance data, skin temperature data, skin humidity data, skin motion data, body part movement data, blinking frequency data, EEG data, information relating to what is being shown on an in-bore display, weight distribution on in-bore examination table.

In an example, the at least one sensor data of the one or more reference patients comprises one or more of: breathing rate data, heart rate data, voice data, skin resistance data, skin temperature data, skin humidity data, skin motion data, body part movement data, blinking frequency data, EEG data, information relating to what is being shown on an in-bore display, weight distribution on in-bore examination table.

In an example, the at least one scan parameter of the MRI scanner comprises one or more of: duration of scan, duration of scan remaining, current gradient strengths, future gradient strengths, type of contrast, timing parameters, SAR (RF-settings), k-space sampling pattern.

In an example, the at least one scan parameter of the reference MRI scanners comprises one or more of: duration of scan, duration of scan remaining, current gradient strengths, future gradient strengths, type of contrast, timing parameters, SAR (RF-settings), k-space sampling pattern.

In an example, the at least one characteristic of the patient comprises one or more of: age, weight, body-mass index, information on a previous diagnosis, physical condition of the patient, psychological condition of the patient, completed questionnaire information, patient feedback.

In an example, the at least one characteristic of each of the reference patient comprises one or more of: age, weight, body-mass index, information on a previous diagnosis, physical condition of the patient, psychological condition of the patient, completed questionnaire information.

In an example, the input unit is configured to provide the processing unit with information regarding one or more previous MRI scans undertaken by the patient, and wherein prediction of the stress level of the patient and/or a motion state of the patient comprises utilization of the information regarding one or more previous MRI scans undertaken by the patient.

In an example, training of the machine learning algorithm comprises utilization of information regarding one or more previous MRI scans undertaken by at least one reference patient of the one or more reference patients.

In an example, the processing unit is configured to determine if the predicted stress level of the patient and/or predicted motion state of the patient will exceed a stress threshold level or a motion threshold level, and wherein the information relating to the predicted stress level of the patient and/or the predicted motion state of the patient comprises an indication if either threshold is predicted to be exceeded.

In a second aspect, there is provided an imaging system comprising;
  a magnetic resonance imaging scanner;
  at least one sensor; and
  an apparatus for monitoring of a patient undergoing a Magnetic Resonance Image (MRI) scan according to the first aspect.

The at least one sensor is configured to provide the processing unit of the apparatus with at least one sensor data of a patient undergoing an MRI scan by an MRI scanner. The apparatus is configured to automatically stop the MRI scan on the basis of the information relating to the predicted stress level of the patient and/or the predicted motion state of the patient.

In a third aspect, there is provided a method for monitoring of a patient undergoing a Magnetic Resonance Image (MRI) scan, the method comprising:
  providing a processing unit with at least one sensor data of a patient undergoing an MRI scan by an MRI scanner;
  providing the processing unit with at least one scan parameter of the MRI scanner for the MRI scan;
  providing the processing unit with at least one characteristic of the patient;
  predicting by the processing unit a stress level of the patient and/or predicting a motion state of the patient, the prediction or predictions comprising utilization of the at least one sensor data of the patient, the at least one scan parameter of the MRI scanner, and the at least one characteristic of the patient; and
  outputting by an output unit information relating to the predicted stress level of the patient and/or the predicted motion state of the patient.

According to another aspect, there is provided a computer program element controlling one or more of the apparatuses or system as previously described which, if the computer program element is executed by a processing unit, is adapted to perform one or more of the methods as previously described.

According to another aspect, there is provided a computer readable medium having stored computer element as previously described.

The computer program element can for example be a software program but can also be a FPGA, a PLD or any other appropriate digital means.

Advantageously, the benefits provided by any of the above aspects equally apply to all of the other aspects and vice versa.

The above aspects and examples will become apparent from and be elucidated with reference to the embodiments described hereinafter.

BRIEF DESCRIPTION OF THE DRAWINGS

Exemplary embodiments will be described in the following with reference to the following drawing.

DETAILED DESCRIPTION OF EMBODIMENTS

Figure 1:
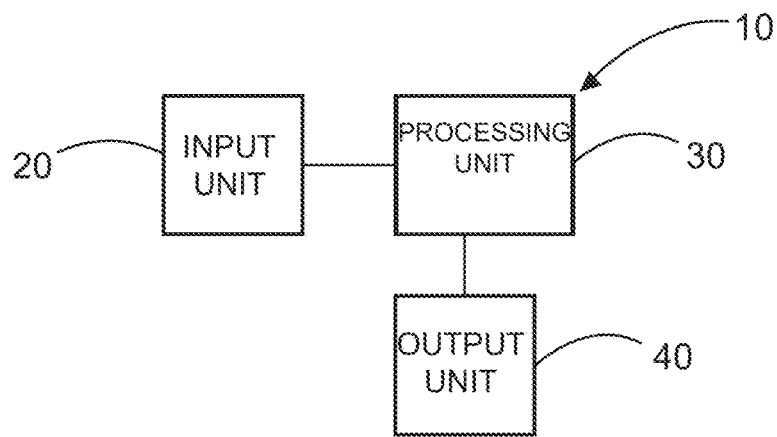
FIG. 1 shows a schematic set up of an example of an apparatus for monitoring of a patient undergoing a Magnetic Resonance Image scan.

FIG. 1 shows an example of an apparatus 10 for monitoring of a patient undergoing a Magnetic Resonance Image (MRI) scan. The apparatus 10 comprises an input unit 20, a processing unit 30, and an output unit 40. The input unit is configured to provide the processing unit with at least one sensor data of a patient undergoing an MRI scan by an MRI scanner. The input unit is configured also to provide the processing unit with at least one scan parameter of the MRI scanner for the MRI scan. The input unit is configured also to provide the processing unit with at least one characteristic of the patient. The processing unit is configured to predict a stress level of the patient and/or predict a motion state of the patient, the prediction or predictions comprising utilization of the at least one sensor data of the patient, the at least one scan parameter of the MRI scanner, and the at least one characteristic of the patient. The output unit is configured to output information relating to the predicted stress level of the patient and/or the predicted motion state of the patient.

According to an example, the processing unit is configured to implement at least one machine learning algorithm to predict the stress level of the patient and/or the motion state of the patient. The at least one machine learning algorithm was trained on the basis of: at least one sensor data of one or more reference patients undergoing one or more reference MRI scans by one or more reference MRI scanners; at least one scan parameter of the reference MRI scanners used for the one or more reference MRI scans; at least one characteristic of each of the reference patients.

In an example, the machine learning algorithm comprises one or more neural networks.

In an example, the machine learning algorithm comprises one or more classical machine learning algorithms.

In an example, the machine learning algorithm comprises one or more Support Vector Machine (SVM).

In an example, the machine learning algorithm comprises one or more decision Trees.

In an example, the at least one machine learning algorithm comprises two parts. A first part of the machine learning algorithm is used to determine a stress state and movement state of a person. Here movement state can mean a likelihood of moving, which can have different levels even for a stationary patient. Thus, a stationary patient can be determined to have a low likelihood of moving, or a stationary patient can be determined to have a high likelihood of moving. A second part of the machine learning algorithm can then operate to determine a prediction into the future of the stress state and movement state of the person. The first part can be for example be a standard neural network such as a convolutional neural network (CNN), and the second part can be a recurrent neural network (RNN) or long short-term memory (LSTM) neural network version of a RNN. Thus, here neural network can refer to a combination of neural networks.

According to an example, the at least one sensor data of the patient was acquired by one or more of: camera, microphone, skin resistance sensor, skin temperature sensor, skin humidity sensor, skin accelerometer, pulse sensor, breathing sensor, radio frequency radar sensor, EEG sensor, processing unit, pressure sensor, weight sensor.

According to an example, the at least one sensor data of the one or more reference patients was acquired by one or more of: camera, microphone, skin resistance sensor, skin temperature sensor, skin humidity sensor, skin accelerometer, pulse sensor, breathing sensor, radio frequency radar sensor, EEG sensor, processing unit, pressure sensor, weight sensor According to an example, the at least one sensor data of the patient comprises one or more of: breathing rate data, heart rate data, voice data, skin resistance data, skin temperature data, skin humidity data, skin motion data, body part movement data, blinking frequency data, EEG data, information relating to what is being shown on an in-bore display, weight distribution on in-bore examination table.

According to an example, the at least one sensor data of the one or more reference patients comprises one or more of: breathing rate data, heart rate data, voice data, skin resistance data, skin temperature data, skin humidity data, skin motion data, body part movement data, blinking frequency data, EEG data, information relating to what is being shown on an in-bore display, weight distribution on in-bore examination table.

According to an example, the at least one scan parameter of the MRI scanner comprises one or more of: duration of scan, duration of scan remaining, current gradient strengths, future gradient strengths, type of contrast, timing parameters, SAR (RF-settings), k-space sampling pattern.

According to an example, the at least one scan parameter of the reference MRI scanners comprises one or more of: duration of scan, duration of scan remaining, current gradient strengths, future gradient strengths, type of contrast, timing parameters, SAR (RF-settings), k-space sampling pattern.

According to an example, the at least one characteristic of the patient comprises one or more of: age, weight, body-mass index, information on a previous diagnosis, physical condition of the patient, psychological condition of the patient, completed questionnaire information, patient feedback.

According to an example, the at least one characteristic of each of the reference patient comprises one or more of: age, weight, body-mass index, information on a previous diagnosis, physical condition of the patient, psychological condition of the patient, completed questionnaire information.

According to an example, the input unit is configured to provide the processing unit with information regarding one or more previous MRI scans undertaken by the patient. The prediction of the stress level of the patient and/or the prediction of the motion state of the patient can then comprise utilization of the information regarding one or more previous MRI scans undertaken by the patient.

According to an example, training of the machine learning algorithm comprises utilization of information regarding one or more previous MRI scans undertaken by at least one reference patient of the one or more reference patients.

According to an example, the processing unit is configured to determine if the predicted stress level of the patient and/or predicted motion state of the patient will exceed a stress threshold level or a motion threshold level. The information relating to the predicted stress level of the patient and/or the predicted motion state of the patient can then comprise an indication if one or other or both of these thresholds is predicted to be exceeded.

Figure 2:
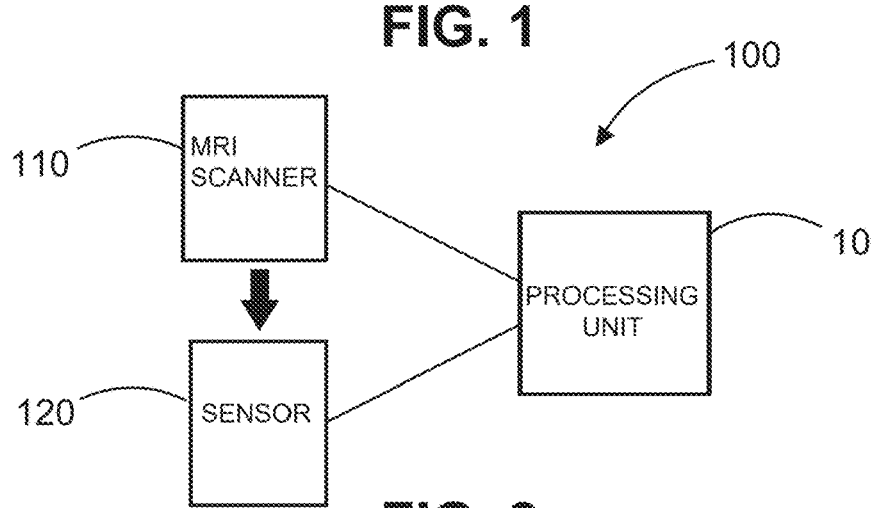
FIG. 2 shows a schematic set up of an example of an imaging system.

FIG. 2 shows an example of an imaging system 100. The imaging system 100 comprises a magnetic resonance imaging scanner 110, at least one sensor 120. The system 100 also comprises an apparatus 10 for monitoring of a patient undergoing a Magnetic Resonance Image (MRI) scan as described with respect to FIG. 2. The at least one sensor 120 is configured to provide the processing unit of the apparatus with at least one sensor data of a patient undergoing an MRI scan by an MRI scanner. The apparatus 10 is configured to automatically stop the MRI scan being performed by the magnetic resonance imaging scanner 110 on the basis of the information relating to the predicted stress level of the patient and/or the predicted motion state of the patient.

Figure 3:
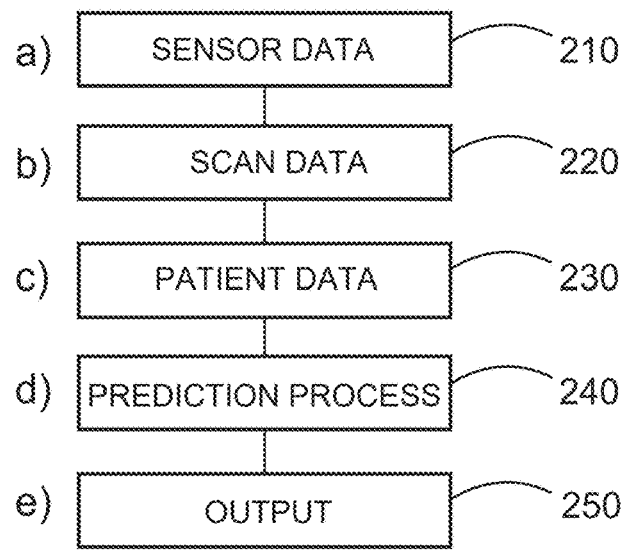
FIG. 3 shows a method for monitoring of a patient undergoing a Magnetic Resonance Image scan.

FIG. 3 shows a method 200 for monitoring of a patient undergoing a Magnetic Resonance Image (MRI) scan in its basic steps. The method 200 comprises:

in a providing step 210, also referred to as step a), providing a processing unit with at least one sensor data of a patient undergoing an MRI scan by an MRI scanner;

in a providing step 220, also referred to as step b), providing the processing unit with at least one scan parameter of the MRI scanner for the MRI scan;

in a providing step 230, also referred to as step c), providing the processing unit with at least one characteristic of the patient;

in a predicting step 240, also referred to as step d), predicting by the processing unit a stress level of the patient and/or predicting a motion state of the patient, the prediction or predictions comprising utilization of the at least one sensor data of the patient, the at least one scan parameter of the MRI scanner, and the at least one characteristic of the patient; and in an outputting step 250, also referred to as step e), outputting by an output unit information relating to the predicted stress level of the patient and/or the predicted motion state of the patient.

In an example, the machine learning algorithm comprises one or more neural networks.

In an example, the machine learning algorithm comprises one or more classical machine learning algorithms.

In an example, the machine learning algorithm comprises one or more Support Vector Machine).

In an example, the machine learning algorithm comprises one or more decision Trees.

In an example, step d) comprises implementing by the processing unit at least one machine learning algorithm to predict the stress level of the patient and/or the motion state of the patient, wherein the at least one machine learning algorithm was trained on the basis of one or more of: at least one sensor data of one or more reference patients undergoing one or more reference MRI scans by one or more reference MRI scanners; at least one scan parameter of the reference MRI scanners used for the one or more reference MRI scans; at least one characteristic of each of the reference patients.

In an example, the at least one sensor data of the patient was acquired by one or more of: camera, microphone, skin resistance sensor, skin temperature sensor, skin humidity sensor, skin accelerometer, pulse sensor, breathing sensor, radio frequency radar sensor, EEG sensor, processing unit, pressure sensor, weight sensor.

In an example, the at least one sensor data of the one or more reference patients was acquired by one or more of: camera, microphone, skin resistance sensor, skin temperature sensor, skin humidity sensor, skin accelerometer, pulse sensor, breathing sensor, radio frequency radar sensor, EEG sensor, processing unit, pressure sensor, weight sensor In an example, the at least one sensor data of the patient comprises one or more of: breathing rate data, heart rate data, voice data, skin resistance data, skin temperature data, skin humidity data, skin motion data, body part movement data, blinking frequency data, EEG data, information relating to what is being shown on an in-bore display, weight distribution on in-bore examination table.

In an example, the at least one sensor data of the one or more reference patients comprises one or more of: breathing rate data, heart rate data, voice data, skin resistance data, skin temperature data, skin humidity data, skin motion data, body part movement data, blinking frequency data, EEG data, information relating to what is being shown on an in-bore display, weight distribution on in-bore examination table.

In an example, the at least one scan parameter of the MRI scanner comprises one or more of: duration of scan, duration of scan remaining, current gradient strengths, future gradient strengths, type of contrast, timing parameters, SAR (RF-settings), k-space sampling pattern.

In an example, the at least one scan parameter of the reference MRI scanners comprises one or more of: duration of scan, duration of scan remaining, current gradient strengths, future gradient strengths, type of contrast, timing parameters, SAR (RF-settings), k-space sampling pattern.

In an example, the at least one characteristic of the patient comprises one or more of: age, weight, body-mass index, information on a previous diagnosis, physical condition of the patient, psychological condition of the patient, completed questionnaire information, patient feedback.

In an example, the at least one characteristic of each of the reference patient comprises one or more of: age, weight, body-mass index, information on a previous diagnosis, physical condition of the patient, psychological condition of the patient, completed questionnaire information.

In an example, the method comprises providing the processing unit with information regarding one or more previous MRI scans undertaken by the patient, and wherein step d) comprises utilizing the information regarding one or more previous MRI scans undertaken by the patient.

In an example, training of the machine learning algorithm comprised utilization of information regarding one or more previous MRI scans undertaken by at least one reference patient of the one or more reference patients.

In an example, step d) comprises determining by the processing unit if the predicted stress level of the patient and/or predicted motion state of the patient will exceed a stress threshold level or a motion threshold level, and wherein in step e) the information relating to the predicted stress level of the patient and/or the predicted motion state of the patient comprises an indication if either threshold is predicted to be exceeded.

Figure 4:
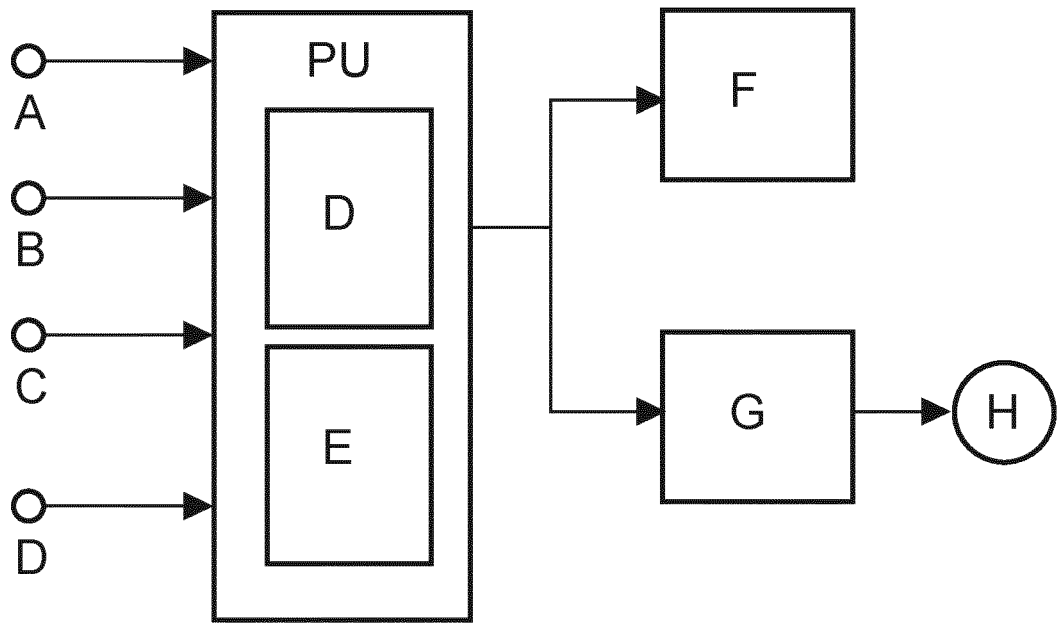
FIG. 4 shows a high level system architecture of a detailed embodiment of the apparatus of FIG. 1 or imaging system of FIG. 2 having such an apparatus.
Figure 5:
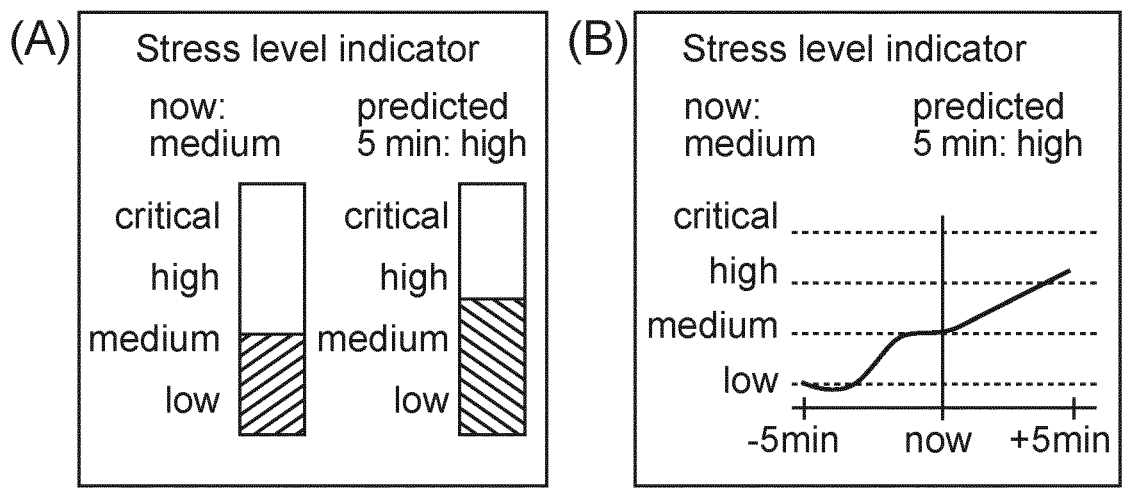
FIG. 5 shows examples of stress level indicators.

The apparatus for monitoring of a patient undergoing a Magnetic Resonance Image scan, the imaging system, and the method for monitoring of a patient undergoing a Magnetic Resonance Image scan are now described in further detail with respect to specific embodiments, where reference is made to FIGS. 4-5.

FIG. 4 shows a high-level system architecture. A patient is undergoing an MRI scan, and biometric and physiological sensors indicated at "A" provide corresponding data to the processing unit indicated out "PU". Scan parameters for the MRI scan, indicated at "B", also provided to the processing unit. Here, the structure of the ExamCard can also be provided to the processing unit, including information such as how long the complete exam or scan will take and how much time is remaining. Information relating to the patient, indicated at "C", is also provided to the processing unit. The processing unit implements a first neural network, indicated at "D", such as a convolutional neural network to predict a stress level for the patient and predict of movement state level of the patient. The processing unit also implements a second new network, indicated at "E", such as a recurrent neural network or Long Short term memory comes new network that acts to predict into the future the stress level and movement state level of the patient. The current and predicted stress level is then displayed to the operator, indicated at "F", and emergency decision logic indicated at "G", utilises the predicted stress level and the predicted movement state level to determine if an emergency stop to the scan should be made, indicated at "H". Thus, the processing unit predicts the patient's stress level and movement state based on a number of parameters ("features") obtained from sensors, scan settings, and patient information. Patient feedback on the experienced stress and movement for that patient and other patients can also be provided for training the internal machine learning algorithms, which can be combined with sensor data and scan parameter information and patient information for those patients undergoing those scans as part of that training.

FIG. 5 shows two examples of stress level indicators determined by the processing unit that are presented to the operator or technologist operating the MRI scanner, indicating the present stress level and future stress level and how that stress level has been progressing up to now and how it is predicted to progress into the future. Motion (or movement) state level indicators, indicating the likelihood of movement of the patient as of now, in the past, and into the future can also be provided in a similar manner. The stress level information and/or movement state level information enables the technologist or operator to initiate an emergency stop if required, and the system itself also can initiate the emergency stop if it is predicted that the stress level will go too high or the likelihood of the patient moving is too great.

The emergency detection logic operates based on the current and predicted stress level and on the current and predicted movement state level information, where the emergency detection logic decides when to stop the MRI scan. Ideally, the logic is configured in a way that the scan is stopped when an increase of stress level above the critical level is expected while the scan is running, or when the likelihood of the patient moving to an unacceptable level is expected, which would mean that the patient would otherwise press the emergency button with a high probability or move in a manner that would compromise scanning image integrity or result in a potentially dangerous situation arising.

Further Details Regarding the Possible Inputs to the Processing Unit are:

Sensors for Emotional and Physical State of the Patient can Include:

Camera-based heart rate and breathing detection. This can be used to measure instantaneous heart rate, which increases when anxiety increases. The heart/breathing rate measured with the preparation app at home can serve as a baseline for this (see below for details of the preparation app).

Camera-based face recognition and emotional state determination (the skilled person would appreciate that this is available AI technology)

Camera-based movement detection technology

Microphone for speech and voice emotion recognition (the skilled person would appreciate that this is available AI technology)

Electrodermal activity sensor

Skin resistance sensor

Skin temperature sensor

Skin humidity sensor

Skin accelerometer

Other pulse and breathing sensors

Camera-based motion detection

Camera-based blinking frequency detection

RF Pilot tone

RF Radar sensor

EEG and ECG data

Hand movement sensor, where for example this can establish micromotion or minimal motion of the hand, which can be unconscious, can link to tension in the hand indicating a rise in stress level Additional or complementary physiological or psychological measures can be taken that can be reflective of increasing anxiety and discomfort: and which include heart rate, respiration frequency, electrodermal activity Monitoring the weight distribution on the patient table. It is established that if a patient is beginning to feel that a body part is about to move involuntarily, they can tense up the whole body or major parts of the body to compensate for this impending movement and this can be detected Sedation monitoring via vital sign monitoring to determine when sedated patients start to wake up. It has been determined that as a patient starts to wake up this can lead to anxiety and motion Scan Parameter Information can Include:

Type of contrast (T1, T2, DWI, etc. . . . )

Timing parameters

Gradient strength settings

SAR (RF-settings)

k-space sampling pattern

Remaining scan time

Information on what is being shown on an in-bore display to the patient, because it has been established that what is shown to the patient can influence their stress level and movement state.

Patient Information (e.g., From Electronic Medical Record) can Include:

Age

Weight

Body-mass-index

Previous diagnosis

Other physical and psychological conditions

From data obtained in the preparation room or at home, before the scan (camera, interview, questionnaire)

more information on such preparation data is detailed below.

Thus, in summary a prediction of the stress level and movement state level is realized by an artificial intelligence (AI) algorithm, using the features as input and the stress level/movement state level as output. The algorithm can be a combination of a machine learning approach for the derivation of the current stress level and movement state level (such as support vector machine or neural network), and a machine learning approach for predicting the development of the stress level during the next few minutes (such as RNN or LSTM). Supervised training of the AI algorithm is realized using feedback from the patient and other patients (e.g., emergency button status or self-estimation of stress level) as labels, and via associated sensor data, scan parameter data for those scans and patient information for the other patients for those scans. Training the algorithm on patient feedback allows to normalize the stress level/movement state level to an individual severity scale. This means that a scale can be defined as a number in the range from 0 (low stress level/low movement state level—i.e., low movement likelihood) to 1 (critical stress level/critical movement state level—i.e., high movement likelihood), where reaching the critical stress level means that the patient is very likely to press the emergency stop button and where reaching the critical movement state level means that the patient is very likely to move and compromise the scan. The output of the processing unit is a value for the patient's current stress level and a prediction of the evaluation of this stress value over the next few minutes, and a value for the patient's current movement state level and a prediction of the evaluation of this likelihood of movement value over the next few minutes. The output of the processing unit is provided to an indicator display for the technologist and to an emergency decision logic.

It is to be noted that in general not all of the abovementioned data will be available for each individual patient. However, the data that are available can be used as input for an anxiety & movement-prediction algorithm. On the basis of the data gathered for the current MRI exam, data on the patient, as well as on the basis of the data of potential earlier exams if available, a prediction can be made as to the expected level of anxiety and likelihood of movement. In addition, on the basis of generic as well as individual data of earlier scans, a prediction can be made of expected image quality (movement interference) and its relation to anxiety/likelihood of movement.

In seeking to improve MRI scans, the inventors realised that the two major limitations were stress developing in the patient during the scan and movement of the patient. In researching these areas the inventors establish that movement and stress are only weakly related (and in some studies, they are completely uncorrelated). For example, extremely anxious patients may show very little movement in the scanner (they are too "frozen" or "petrified" to move). And relaxed patients may move because they have an itch/because a body part falls asleep or they are so relaxed about the procedure that they forget they shouldn't move.

Further examples are:

A sudden reduction of movement in a body part may increase the risk of motion, while the anxiety-curve may show a very different pattern.

Thus, if a person's arm falls asleep, this may temporarily reduce motion in that arm in the short term, but increase the likelihood of motion in the longer term (once the numbness turns into pain and the person repositions).

If a person completely falls asleep, there will be very little motion until that person wakes up. How long the person has been asleep and how deep their sleep is and when they are predicted to wake (combined with MR noise level etc) can be a better predictor of movement in the future.

Thus, this means that there is a complex relationship between anxiety & movement and that it is possible that reducing anxiety can either increase motion likelihood (e.g., when going from a "petrified" state to a slightly less anxious state) or reduce it, depending on a number of factors.

However, the inventors established that by monitoring the patient with sensors, and using scan parameters of the scan now and in the future, and information relating to the patient it is possible to train machine learning algorithms to determine both how a stress level will develop and how the likelihood of the patient moving will develop.

Thus, the inventors were aware of AI-based tools that utilize sensor information for recognizing human emotions that have been developed in recent years. This includes facial emotion recognition (e.g., https://azure.microsoft.com/en-us/services/cognitive-services/emotion/), speech emotion recognition (e.g., http://www.good-vibrations.nl/, https://vokaturi.com/), and emotion recognition though other physiological sensors (see, e.g., https://www.wareable.com/health-and-wellbeing/future-of-emotion-sensing-wearables-111, https://biosay.com/). The inventors utilized the understanding of these technologies in combination with scan information of a MRI scanner, patient background information and additional sensor in combination with a dedicated prediction algorithm, to help detect and react to emergency situations in MR examinations and increase patient comfort and safety. In this manner. The the emotional and physiological state of the patient is in effect analysed and the development of this state is predicted. Real-time feedback is provided to the technologist and an automatic decision can be made when to stop a scan based on the current and predicted emotional and physiological state of the patient. In this way, patient experience is improved (less anxiety or pain), the patient is safer due to an automated emergency stop of the system, and the workflow can be improved, because scans can be stopped and repeated earlier.

Data gathered before the current MRI exam is utilised in determining the predicted stress level and predicted motion state level as discussed above. Below, is described in detail one specific methodology by which this information, or at least part of this information relating to the patient, can be gathered. The data gathered is termed "preparation data".

Preparation Data

Before the MRI-exam, patients receive online information and training (e.g., in the form of a smartphone app) to help them prepare for the upcoming MRI-exam at home or within the hospital. This app can consist of several elements, such as a) information for patients; b) training exercises; c) questionnaires about the patient; and d) a measurement of their heart and breathing rate, skin colour, and/or reaction speed.

The information for patients can consist of text, video, or audio that gives patients information about the upcoming scan or medical procedure (e.g., a video with information about an MRI-scan, the MRI machine, and what happens).

The training exercises provide participants with specific coaching or training to improve skills that allow them to undergo the medical procedure; among other things, exercises include improving the ability to lie still for an extended period of time and/or the ability to hold their breath for a certain time/follow a specific breathing pattern.

Questionnaires will consist of demographic questions, e.g., about a patient's age, number of previous scans, educational level, etc; as well as other relevant questions (e.g., about patient's claustrophobia, anxiety level, etc.). In addition, other questionnaire input like self-reports can be gathered. For example, patient's perception of the upcoming scan and their own expectation. Finally, each piece of information or activity can be followed by questions related to the patients' perception of the scan.

The heart and breathing rate measurement can be acquired with the aid of a mobile phone. It can give an indication of someone's basal heart rate, possibly before and after the training material & questionnaires were accessed by the user. Such measurement can also be followed up by the patient's perception and expectation. Heart rate and breathing rate measurements can also be conducted just before the examination and compared to the baseline measurements done earlier.

Skin colour could be determined with a phone in the face area as measured before the examination and just before the examination.

By creating a small game-app, patient's reaction time can be determined at home and when they are sitting in the waiting room.

As such, the preparation data can consist of:

Usage data from a mobile application (e.g., number of logins, time spent in the app);

Data from questionnaires (e.g., questionnaires about the patient's age, educational level, anxiety, and perception and expectation etc.);

Training-specific data (e.g., the amount of time a participant is able to lie still when training at home; the number of seconds they can hold their breath; their heart rate as measured by the app, the number of times they use the different features of the app).

Physiological parameters (heart rate or breathing rate changes, skin colour change, and reaction time difference).

Training of the Machine Learning Algorithm

Regarding the implementation of the one or more machine learning algorithms, as discussed above there are two parts of the implementation that can be distinguished:

Machine learning algorithms (classical SVM, decision trees, or neural networks) can be employed to determine the current stress level and determine the current movement state level from sensor data and other information (not yet predicting the future). In this case, the algorithm would be trained with historic data that is labelled using subjective feedback from the patient or objective measurements, such as frequency of patient-initiated scan aborts or severe motion artifacts, or other information as discussed above.

Alternatively, the stress level and/or movement state level can be computed from the sensor data using an analytic known function.

For the prediction of the future development of the stress level and of the future development of the movement state level, an implementation using recurrent neural networks (RNNs) has been found to be particularly suitable. Specifically, a Long-Short-Term-Memory (LSTM) implementation has been found to be well suited here. This machine learning implementation is fed with both context information (patient condition, type of scan, etc.) and the development of the stress level as a function of time (up to the present moment) and/or movement state level as a function of time. The network would then predict how the stress level will continue in the future and how the movement state level will continue into the future. To train such a network, it is necessary to record the temporal evolution of the stress level, and movement state level, along with the context information for multiple subjects and use that as training data.

It is to be noted, that the two parts discussed above can operate individually for stress level and movement state level prediction, or combined. Thus, there can be algorithms at 1 that determine the current stress level and different algorithms that determine the current movement state level. Then at 2, there can be there can be algorithms that predict the future stress level and different algorithms that predict the future movement state level. However, the same algorithms at 1 can determine both stress level and movement state level, and the same algorithms at 2 can predict the future stress level and movement state level, In another exemplary embodiment, a computer program or computer program element is provided that is characterized by being configured to execute the method steps of the method according to one of the preceding embodiments, on an appropriate apparatus or system.

The computer program element might therefore be stored on a computer unit, which might also be part of an embodiment. This computing unit may be configured to perform or induce performing of the steps of the method described above. Moreover, it may be configured to operate the components of the above described apparatus and/or system. The computing unit can be configured to operate automatically and/or to execute the orders of a user. A computer program may be loaded into a working memory of a data processor. The data processor may thus be equipped to carry out the method according to one of the preceding embodiments.

This exemplary embodiment of the invention covers both, a computer program that right from the beginning uses the invention and computer program that by means of an update turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, USB stick or the like, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a

The invention claimed is:

1. An apparatus for monitoring of a patient undergoing a Magnetic Resonance Image (MRI) scan, the apparatus comprising:
    an MRI scanner configured to scan the patient, and to acquire scanned images;
    an input;
    a processor adapted to receive from the input: at least one sensor data of a patient undergoing an MRI scan by the MRI scanner; at least one scan parameter of the MRI scanner for the MRI scan; and at least one characteristic of the patient from the sensor data comprising an emotional and a physical state of the patient;
    a memory that stores instructions, which when executed by the processor cause the processor to implement at least one machine learning algorithm to predict a future likelihood of movement of the patient, the prediction comprising utilization of the at least one sensor data of the patient, the at least one scan parameter of the MRI scanner, and the at least one characteristic of the patient; and
    and an output configured to output information relating to the predicted future likelihood of movement of the patient and a likelihood of motion artifacts in an MRI image resulting from the predicted future likelihood of movement, wherein in accordance with the output information, the apparatus is configured to stop the scan based on the predicted stress level predicted likelihood of movement exceeding a threshold.

2. The apparatus according to claim 1, wherein the at least one machine learning algorithm is trained based on sensor data from at least one reference patient undergoing reference MRI scans, characteristics of the at least one reference patient and the stress level of the at least one reference patient.

3. The apparatus according to claim 2, wherein a sensor comprises one or more of a: camera, microphone, skin resistance sensor, skin temperature sensor, skin humidity sensor, skin accelerometer, pulse sensor, breathing sensor, radio frequency radar sensor, EEG sensor, pressure sensor, weight sensor.

4. The apparatus of claim 2, wherein the at least one sensor data of the patient of the at least one reference patient comprises one or more of:
    breathing rate data, heart rate data, voice data, skin resistance data, skin temperature data, skin humidity data, skin motion data, body part movement data, blinking frequency data, EEG data, and information relating to what is being shown on an in-bore display, weight distribution on in-bore examination table.

5. The apparatus of claim 2, wherein the at least one scan parameter of the MRI scanner and of the reference MRI scans comprises one or more of a: duration of scan, duration of scan remaining, current gradient strengths, future gradient strengths, type of contrast, timing parameters, SAR RF-settings, k-space sampling pattern.

6. The apparatus of claim 2, wherein the at least one characteristic of the patient and of each of the least one reference patient comprises one or more of: age, weight, body-mass index, information on a previous diagnosis, physical condition of the patient, psychological condition of the patient, completed questionnaire information.

7. The apparatus of claim 2, wherein the input is configured to provide the processor with information regarding one or more previous MRI scans undertaken by the patient, and wherein prediction of the stress level of the patient comprises utilization of the information from one or more previous MRI scans undertaken by the same patient.

8. The apparatus of claim 1, further comprising:
    a sensor adapted to acquire the at least one sensor data from a patient.

9. The apparatus of claim 1, wherein during the MRI scan, the output comprises a display adapted to provide the output information to a user, and based on the predicted stress level, indicates to the user when an emergency stop to the scan should be made.

10. The apparatus according to claim 1, wherein based on the likelihood of motion artifacts, the processor is adapted to cause the scan to be aborted when the stress level exceeds a threshold.

11. An apparatus for monitoring of a patient undergoing a Magnetic Resonance Image (MRI) scan, the apparatus comprising:
    an MRI scanner configured to scan the patient, and to acquire scanned images;
    an input;
    a processor adapted to receive from the input: at least one sensor data of a patient undergoing an MRI scan by the MRI scanner; at least one scan parameter of the MRI scanner for the MRI scan; and at least one characteristic of the patient from the sensor data comprising an emotional and a physical state of the patient;
    a memory that stores instructions, which when executed by the processor cause the processor to implement at least one machine learning algorithm to predict a future likelihood of movement of the patient, the prediction comprising utilization of the at least one sensor data of the patient, the at least one scan parameter of the MRI scanner, and the at least one characteristic of the patient;
    an output configured to output information relating to the predicted future likelihood of movement of the patient and the likelihood of motion artifacts in an MRI image resulting from the predicted future likelihood of movement, wherein in accordance with the output information, the apparatus is configured to stop the scan based on the predicted likelihood of movement exceeding a threshold.

12. The apparatus according to claim 11, wherein the at least one machine learning algorithm is trained based on sensor data from reference patients undergoing reference MRI scans, characteristics of the reference patients and the likelihood of movement of the reference patients.

13. The apparatus according to claim 12, wherein a sensor comprises one or more of a: camera, microphone, skin resistance sensor, skin temperature sensor, skin humidity sensor, skin accelerometer, pulse sensor, breathing sensor, radio frequency radar sensor, EEG sensor, pressure sensor, weight sensor.

14. The apparatus of claim 12, wherein the at least one sensor data of the patient of the at least one reference patient comprises one or more of: breathing rate data, heart rate data, voice data, skin resistance data, skin temperature data, skin humidity data, skin motion data, body part movement data, blinking frequency data, EEG data, information relating to what is being shown on an in-bore display, weight distribution on in-bore examination table.

15. The apparatus of claim 12, wherein the at least one scan parameter of the MRI scanner and of the reference MRI scans comprises one or more of a: duration of scan, duration of scan remaining, current gradient strengths, future gradient strengths, type of contrast, timing parameters, SAR RF-settings, k-space sampling pattern.

16. The apparatus of claim 12, wherein the at least one characteristic of the patient and of each of the least one reference patient comprises one or more of: age, weight, body-mass index, information on a previous diagnosis, physical condition of the patient, psychological condition of the patient, completed questionnaire information.

17. The apparatus of claim 12, wherein the input is configured to provide the processor with information regarding one or more previous MRI scans undertaken by the patient, and wherein prediction of the stress level of the patient comprises utilization of the information from one or more previous MRI scans undertaken by the same patient.

18. The apparatus of claim 11, further comprising:
a sensor adapted to acquire the at least one sensor data from a patient.

19. The apparatus of claim 11, wherein during the MRI scan, the output comprises a display adapted to provide the output information to a user, and based on the predicted stress level, indicates to the user when an emergency stop to the scan should be made.

20. The apparatus according to claim 11, wherein based on the likelihood of motion artifacts, the processor is adapted to cause the scan to be aborted when the stress level exceeds a threshold.

21. A method for monitoring of a patient undergoing a Magnetic Resonance Image (MRI) scan, the method comprising:
providing an MRI scanner configured to scan the patient, and to acquire scanned images;
providing a processor with at least one sensor data of a patient undergoing an MRI scan by the MRI scanner;
providing the processor with at least one scan parameter of the MRI scanner for the MRI scan; providing the processor with at least one characteristic of the patient from the sensor data comprising an emotional and a physical state of the patient; predicting by the processor implementing at least one machine learning algorithm a future likelihood of movement of the patient, the prediction comprising utilization of the at least one sensor data of the patient, the at least one scan parameter of the MRI scanner, and the at least one characteristic of the patient; and
outputting by an output, information relating to the predicted likelihood of movement of the patient and information on a likelihood of motion artifacts in an MRI image resulting from the predicted movement, wherein in accordance with the output information, the apparatus is configured to stop the scan based on the predicted likelihood of movement exceeding a threshold.

22. The method of claim 21, further comprising:
acquiring with a sensor the least one sensor data from a patient.

23. The method of claim 21, wherein during the MRI scan, the output comprises a display adapted to provide the output information to a user, and based on the predicted stress level, indicates to the user when an emergency stop to the scan should be made.

24. The method of claim 21, further comprising, based on the likelihood of motion artifacts, aborting the scan when the stress level exceeds a threshold.

* * * * *